United States Patent [19]

Cole et al.

[11] 4,379,808
[45] Apr. 12, 1983

[54] SHEET TYPE FORMING BOARD AND FORMED BOARD PRODUCTS

[75] Inventors: John N. Cole, Maineville; David A. Hettel, Cincinnati, both of Ohio

[73] Assignee: The Mead Corporation, Dayton, Ohio

[21] Appl. No.: 164,454

[22] Filed: Jun. 30, 1980

[51] Int. Cl.$^3$ .................... B32B 23/00; B32B 29/02
[52] U.S. Cl. .................... 428/438; 156/62.2; 156/196; 156/242; 162/142; 162/146; 162/181.1; 264/109; 264/112; 264/119; 428/441; 428/454; 428/511; 428/535; 428/537
[58] Field of Search ........... 162/142, 146, 148, 181 R; 156/242, 62.2, 196; 428/286, 288, 438, 441, 454, 511, 537, 535; 264/109, 112, 119

[56] References Cited

U.S. PATENT DOCUMENTS

| | | | |
|---|---|---|---|
| 1,161,696 | 11/1915 | Lagermarck et al. | |
| 3,669,829 | 6/1972 | Caldo et al. | 162/146 |
| 3,743,570 | 7/1973 | Yang et al. | 162/157 R |
| 3,880,975 | 4/1975 | Lundmark | 156/62.2 X |
| 3,954,556 | 5/1976 | Jackson et al. | 162/145 |
| 3,960,794 | 6/1976 | Sander et al. | 162/146 X |
| 4,096,313 | 6/1978 | Fujita et al. | 428/304 |
| 4,132,590 | 1/1979 | Yamada et al. | 162/145 |
| 4,132,591 | 1/1979 | Merges | 162/146 |
| 4,154,883 | 5/1979 | Elias | 162/148 X |
| 4,156,628 | 5/1979 | Rave | 162/157 R |
| 4,162,180 | 7/1979 | Burton et al. | 162/146 X |
| 4,210,692 | 7/1980 | Bohme et al. | 428/286 X |
| 4,245,689 | 1/1981 | Grard et al. | 428/286 X |
| 4,325,899 | 4/1982 | Cole et al. | 264/86 |

*Primary Examiner*—Robert A. Dawson
*Attorney, Agent, or Firm*—Biebel, French & Nauman

[57] ABSTRACT

A sheet type forming board for use in heat forming processes without the need for pre-soaking or pre-steaming required of prior hardboard materials. The forming board sheet has at least one layer containing cellulose fibers, a polyolefin, and an inorganic filler. Its moisture content is preferably 4–12%. A multi-layered sheet, wherein plys are joined together, is typically used to achieve the desired thickness and composite sheet composition. The formed products are light weight and have a number of desirable advantages, including rigidity, embossing and graining fidelity, and dielectric processability.

12 Claims, No Drawings

SHEET TYPE FORMING BOARD AND FORMED BOARD PRODUCTS

BACKGROUND OF THE INVENTION

1. Field of the Invention

The present invention relates to a forming board sheet for use in heat forming processes for molding automobile rear window ledges or trays, automobile dome liners, or other parts for automobile interior, and other types of structural materials, various types of packaging materials, etc. More particularly, it relates to a low-moisture content layered sheet, at least one layer of which comprises cellulose fibers, a polyolefin, and an inorganic filler.

2. Prior Art

Hardboard is used extensively both domestically and industrially due to its low cost and ease of manufacture. Hardboard usually comprises a cellulose fiber such as ground wood, water, and a binder such as latex, starch or urea formaldehyde. Of hardboards having the aforementioned compositions, those in which the binder is latex or non-cured urea formaldehyde are known as formable hardboards in that a hardboard sheet of this composition can be formed in a hot press with the application of heat and pressure.

As presently as practiced, the method of heat forming hardboard includes the steps of placing a sheet of hardboard which has been soaked in water and allowed to age in the wet state for several days and then steamed or dipped in hot water before use between upper and lower platens of a die, bringing the platens together while applying heat and pressure to the hardboard whereby the hardboard is softened and formed in the die, separating the platens, and removing the hardboard form from the die. During this forming operation, the heat and pressure cause the hardboard to generate gases and vapours which are entrapped within the hardboard by the die causing blisters and defects in the finished formed hardboard.

Accordingly, it would be desirable to have a low-moisture content forming board to replace the hardboards of the past, so as to reduce the tendency to generate such gases and vapours during the heat forming operation. More significantly, it would be desirable to eliminate the need for soaking and steaming or dipping the board before use. These steps require the expenditure of time and money. In addition, they necessitate the use of cumbersome, energy consuming equipment.

SUMMARY OF THE INVENTION

The present invention provides an improved forming board sheet for use in a heat forming process and, thus, an improved formed board product as the end result. The forming board sheet is a low-moisture content one which tends to reduce the amount of moisture generated during heat forming. And yet, it is easily formable in a conventional hot press without the requirement for pre-soaking and/or pre-steaming.

The forming board sheet of the present invention has at least one layer made up of cellulose fibers, a polyolefin and an inorganic filler. It preferably has a moisture content of 4–12 percent by weight. The preferred percentages of the components are, by weight: 43–73% cellulose fiber, 12–30% polyolefin powder, granules or fibers, and 15–45% inorganic filler.

The cellulose fibers are preferably secondary wood fibers from recycled corrugated board or mixture of corrugated board, old newspapers and mixed papers; although, virgin pulp could be used if expense considerations are unimportant. The pololefin may be polypropylene fibers, polyethylene fibers, or mixtures thereof, or it may be a powdered or granular polypropylene, polyethylene, or mixture thereof. The inorganic filler may be talc, glass fibers, wollastonite, mineral fibers, clay, or calcium carbonate. Most preferred is a composition comprising approximately 65% recycled cellulose fibers, approximately 15% polypropylene fibers, and approximately 20% talc.

As mentioned, at least one layer of the forming board sheet of the present invention should have these three basic components. The sheet can be a single-layered product of such a composition. However, in preferred form it will be a multi-layered arrangement. That is several layers may be laminated together with an adhesive such as water based polyvinyl alcohol material, a hot melt adhesive, solvent based adhesives, or other known adhesives for bonding cellulose-based board sheets together. Two, three, four or more plys are typically used to achieve the desired final thickness. The individual plys may have different percentages of components to give various properties such as density, stiffness, hot rigidity and hot pliability to the composite sheet. Likewise, one or more of the plys may be of a different composition entirely, such as a known paperboard type material, as long as the desired forming properties are not lost thereby.

Finally, it is possible to join two plys together, of the same or different composition, without the use of adhesive by blending the composition to produce layers within the sheet as it is formed in the first place.

The result is a forming board sheet that can be formed without preheating, soaking or steaming. It can be formed in conventional hot forming dies or package tray dies; although, it is particularly designed for use in the heat forming process and apparatus disclosed in copending application Ser. No. 164,627, filed on even date herewith, now U.S. Pat. No. 4,325,899, issued Apr. 20, 1982.

The forming board sheet of the present invention is light-weight, has excellent embossing and graining fidelity and is dielectrically processable. Both it and products formed of it are gluable, paintable, non-staining, odor free, flame resistant, water resistant and impact and shatter resistant.

Accordingly, it is an object of the invention to provide a forming board sheet for use in a heat forming process; to provide one which has a low-moisture content and yet can be used without presoaking or pre-steaming; to provide for a multi-layered forming board sheet wherein the make-up of the layers may be varied to adjust the forming properties of the sheet to the desired level; and to provide a formed board product.

Other objects and advantages of the invention will be apparent from the following description and the appended claims.

DETAILED DESCRIPTION OF THE PREFERRED EMBODIMENT

A typical cylinder board machine is used to produce a single layer of material having a thickness within the range of 0.009 to 0.045 inches, which is common for such machines. An aqueous slurry of the following components is introduced into the cylinder board machine: cellulose fibers, preferably recycled cellulose fibers reclaimed from corrugated board or other secondary fiber sources; a polyolefin, such as polypropylene fibers having a length in the range of from 0.2 mm to 3.0 mm., and an inorganic filler such, as talc having a relatively large particle size (16 micron average).

Of course, as mentioned other types of cellulose fibers may be used; the polypropylene fibers may be substituted for, all or in part, by polyethylene fibers in order to adjust the softening and melting point of the forming board sheet or powdered or granular polyolefins could be used, and various types of inorganic fibers, pigments and particles may be used as the filler.

These components make up this layer of material in the following weight amounts:

| Component | Range | Preferred Amount |
|---|---|---|
| Cellulose Fibers | 43–73% | 65% |
| Polypropylene Fibers | 12–30% | 15% |
| Talc | 15–45% | 20% |

The moisture content of the produced layer is preferably 4–12%.

The single layer may be used as the forming board sheet of the present invention; although, it may be regarded as too thin for many applications. Accordingly, the preferred form of the present invention is a multi-ply sheet having at least one layer of this composition. Two, three or four or more plys may be used to give the forming board sheet its desired final thickness, which can range from 0.080 to 0.120 inch. These plys are laminated together using an adhesive between each and by applying pressure by running the joined lamina into the nip of a pressure roller at relatively low pressure settings. Alternatively, a standard paperboard composition may be fed to one cylinder of the cylinder board machine while the forming board composition is fed to another. The result is a two-plied sheet but having no adhesive between the layers.

The final properties of the forming board sheet may also be determined by the lamination or process of forming to produce a multiple plied sheet. Thus, plys of different compositions may be employed. This is true both in terms of varying the percentages of cellulose fiber, polyolefin, and inorganic filler used as well as using a different composition layer entirely. In this manner, various properties such as density, stiffness, hot rigidity and hot pliability may be appropriately varied. For example a three ply forming board sheet may have two outer plys of the present composition while the inner ply is a standard paperboard material. In that case, the structural properties of the paperboard are obtained but the composite is formable without the need for pre-soaking or pre-steaming.

The laminated forming board sheet which results, however, is intended to be formable without pre-soaking or pre-steaming. Thus, it may be used in a heat forming process and apparatus such as the one described in copending application Ser. No. 164,627 (now U.S. Pat. No. 4,325,899), where it is disclosed that a sheet of the preferred embodiment herein containing polypropylene fibers may be formed at 310°–450° F., typically 340°–420° F., and at between 50 and 300 lbs/sq. in pressure. Of course, other temperatures and pressures may also be used. For instance if, as disclosed in an alternative embodiment herein, a polyethylene material is used having a relatively low melting point, the temperature applied may be lowered accordingly. The time of heat forming will vary depending on temperature, the higher the temperature, the shorter the dwell time in the die. For example, at high temperature and pressure it is necessary to apply pressure for as little as 5 seconds, whereas, at lower temperatures and pressures a dwell time of up to 1½ minutes might be required.

The formed part when removed from the die is in a rigid condition. As such, it does not need to be placed in a post-form to cool and maintain its shape. After cooling, the part is ready for painting or further processing. It is dimensionally stable, as much as 25% lighter in weight than the handboard formed products of the past, has a uniform caliper, weight and surface finish, and possesses the other properties already mentioned.

EXAMPLE

A Hydrapulper (a Black Clawson machine for slushing and defibering fibrous material for making paper and paperboard products) was charged with water and corrugated box clippings to make a slurry of approximately 2% concentration. The amount of cellulose fibers in the form of corrugated box clippings used was 3300 lbs. After the pulp slurry was formed, 762 lbs. of polypropylene fiber, Pulpex P, from Hercules, Inc. was added to the slurry. Added next was 1,015 lbs of a Vermont talc.

This slurry was mixed and then passed through refiners to give a freeness of 400–450 Canadian standard freeness. The pH was adjusted to 5.5 and the slurry run on a cylinder board machine. The product was dried on the dryer cans to give a moisture content level of approximately 3% and, then, wound into rolls. The rolls were moved to the laminator and three (3) plys bonded together with a polyvinyl alcohol adhesive to produce a multi-layered forming board of 0.100 inch thickness.

While the articles herein described constitute preferred embodiments of this invention, it is to be understood that the invention is not limited to these precise articles, and that changes may be made therein without departing from the scope of the invention.

What is claimed is:

1. A forming board sheet for use in a heat forming process, comprising at least a first layer consisting essentially of (a) cellulose fibers, (b) a solid particulate polyolefin, and (c) an inorganic filler and having a moisture content of between approximately 4–12% by weight, whereby said forming board is easily formable in a conventional hot press without the requirement of pre-soaking and/or pre-steaming.

2. The forming board sheet of claim 1 wherein said sheet consists of multiple layers.

3. The forming board sheet of claim 2 wherein a second layer of paperboard material is joined to at least said first layer to form a multiple layer sheet.

4. The forming board sheet of claim 1 wherein said first layer consists essentially of by weight 43–73% cellulose fibers, 12–30% polyolefin fibers, and 15–45% inorganic filler.

5. The forming board sheet of claim 4 wherein said polyolefin fibers are selected from the group consisting of polypropylene fibers, polyethylene fibers, and mixtures thereof.

6. The forming board sheet of claim 5 wherein said inorganic filler is selected from the group consisting of talc, glass fibers, wollastonite, mineral fibers, clay, and calcium carbonate.

7. The forming board sheet of claim 6 wherein said cellulose fibers comprise at least in part secondary fibers from recycled corrugated board.

8. The forming board sheet of claim 7 wherein said first layer consists by weight of approximately 65% cellulose fibers, approximately 15% polypropylene fibers, and approximately 20% talc.

9. A formed board comprising a forming board sheet which has been treated by a heat forming process without pre-soaking and/or pre-steaming to produce a shaped structural product, said forming board sheet having at least a first layer consisting essentially of (a) cellulose fibers, (b) a solid particulate polyolefin, and (c) an inorganic filler and having a moisture content of between approximately 4–12% by weight.

10. The formed board of claim 9 wherein said first layer consists essentially of by weight 43–73% cellulose fibers, 12–30% polyolefin fibers, and 15–45% inorganic filler.

11. The formed board of claim 10 wherein said first layer consists by weight of approximately 65% cellulose fibers, approximately 15% polypropylene fibers, and approximately 20% talc.

12. The formed board of claim 9 wherein a second layer of paperboard material is joined to at least said first layer to form multiple layer shaped structural product.

* * * * *